(12) United States Patent
Yang

(10) Patent No.: US 10,868,774 B2
(45) Date of Patent: Dec. 15, 2020

(54) LINE CARD CHASSIS, MULTI-CHASSIS CLUSTER ROUTER, ROUTING SELECTING, AND PACKET PROCESSING

(71) Applicant: NEW H3C TECHNOLOGIES CO., LTD., Hangzhou (CN)

(72) Inventor: Wu Yang, Beijing (CN)

(73) Assignee: NEW H3C TECHNOLOGIES CO., LTD., Hangzhou (CN)

(*) Notice: Subject to any disclaimer, the term of this patent is extended or adjusted under 35 U.S.C. 154(b) by 187 days.

(21) Appl. No.: 15/778,396

(22) PCT Filed: Nov. 24, 2016

(86) PCT No.: PCT/CN2016/107041
§ 371 (c)(1),
(2) Date: May 23, 2018

(87) PCT Pub. No.: WO2017/088781
PCT Pub. Date: Jun. 1, 2017

(65) Prior Publication Data
US 2018/0359194 A1 Dec. 13, 2018

(30) Foreign Application Priority Data
Nov. 24, 2015 (CN) .......................... 2015 1 0821616

(51) Int. Cl.
*H04L 12/933* (2013.01)
*H04L 12/773* (2013.01)
(Continued)

(52) U.S. Cl.
CPC ........... *H04L 49/10* (2013.01); *H04B 10/801* (2013.01); *H04L 49/40* (2013.01);
(Continued)

(58) Field of Classification Search
CPC .... H04B 10/801; H04J 14/0267; H04L 45/60; H04L 49/10; H04L 49/15; H04L 49/40;
(Continued)

(56) References Cited

U.S. PATENT DOCUMENTS 6,796,716 B1 9/2004 Handforth et al.
7,106,729 B1 9/2006 Gullicksen et al.
(Continued)

FOREIGN PATENT DOCUMENTS

CN 101098238 A 1/2008
CN 101296186 A 10/2008
(Continued)

OTHER PUBLICATIONS

United States Patent and Trademark Office, Office Action Issued in U.S. Appl. No. 15/778,458, dated Jul. 10, 2019, 50 pages.
(Continued)

*Primary Examiner* — Ahmed Elallam
(74) *Attorney, Agent, or Firm* — McCoy Russell LLP

(57) ABSTRACT

Disclosed is a line card frame. The line card frame internally comprises a line card unit, a switching unit, and an optical fiber interface unit. The switching unit internally comprises a switching chip module and an onboard optical component module, the onboard optical component module being used for realizing mutual conversion of an optical signal and an electrical signal; an electrical signal interface of the onboard optical component module is connected to the switching chip module having an exchange routing function, and the switching chip module is connected to the line card unit by means of an electric connector; an optical signal interface of the onboard optical component module is connected to the optical fiber interface unit by means of an optical connector; and the optical fiber interface unit connects the optical signal to a cluster interface on a router panel by means of an optical
(Continued)

fiber, and the cluster interface is used for realizing the cascading between different frames of a router. Also disclosed are a router applying the line card frame, a routing method, and a message processing method.

12 Claims, 7 Drawing Sheets

(51) Int. Cl.
| | |
|---|---|
| *H04J 14/02* | (2006.01) |
| *H04Q 11/00* | (2006.01) |
| *H04Q 1/04* | (2006.01) |
| *H04Q 1/50* | (2006.01) |
| *H04L 12/931* | (2013.01) |
| *H04B 10/80* | (2013.01) |

(52) U.S. Cl.
CPC ...... *H04Q 11/0066* (2013.01); *H04J 14/0267* (2013.01); *H04L 45/60* (2013.01); *H04L 49/15* (2013.01); *H04Q 2011/0052* (2013.01)

(58) Field of Classification Search
CPC ............... H04L 49/25; H04Q 11/0066; H04Q 2011/0052; H04Q 11/0005; H04Q 11/0071; H04Q 1/04
See application file for complete search history.

(56) References Cited

U.S. PATENT DOCUMENTS

| | | | |
|---|---|---|---|
| 7,110,394 | B1 | 9/2006 | Chamdani et al. |
| 7,720,061 | B1 | 5/2010 | Krishnaswamy et al. |
| 8,699,878 | B2* | 4/2014 | Sindhu .................. H04L 49/102 398/49 |
| 8,830,992 | B1* | 9/2014 | Ma .......................... H04L 49/40 370/359 |
| 9,020,356 | B2* | 4/2015 | Xia |
| 9,137,176 | B2* | 9/2015 | Campbell ............. H04L 49/356 |
| 9,215,007 | B2 | 12/2015 | Zhong |
| 9,544,667 | B2* | 1/2017 | Hu ..................... H04Q 11/0066 |
| 10,735,839 | B2* | 8/2020 | Yang .................. H04J 14/0267 |
| 2004/0052527 | A1 | 3/2004 | Kirby |
| 2005/0259571 | A1* | 11/2005 | Battou ...................... G06F 8/65 370/217 |
| 2009/0003327 | A1* | 1/2009 | Zang ....................... H04L 49/15 370/359 |
| 2010/0021166 | A1 | 1/2010 | Way |
| 2013/0088971 | A1* | 4/2013 | Anantharam ........... H04L 49/10 370/236 |
| 2013/0272643 | A1 | 10/2013 | Traverso et al. |
| 2014/0247826 | A1 | 9/2014 | Ma |
| 2014/0255022 | A1 | 9/2014 | Zhong |
| 2015/0295862 | A1 | 10/2015 | Banerjee et al. |
| 2018/0359194 | A1 | 12/2018 | Yang |
| 2019/0253777 | A1* | 8/2019 | Yang ................... H04J 14/0267 |

FOREIGN PATENT DOCUMENTS

| | | |
|---|---|---|
| CN | 101631081 A | 1/2010 |
| CN | 101895398 A | 11/2010 |
| CN | 101917337 A | 12/2010 |
| CN | 102217252 A | 10/2011 |
| CN | 102326358 A | 1/2012 |
| CN | 102726058 A | 10/2012 |
| CN | 102907054 A | 1/2013 |
| CN | 103067795 A | 4/2013 |
| EP | 1892905 A1 | 2/2008 |
| EP | 2670082 A1 | 12/2013 |
| JP | H07307962 A | 11/1995 |
| JP | 2003167164 A | 6/2003 |
| JP | 2006279362 A | 10/2006 |
| JP | 2008306555 A | 12/2008 |
| WO | 2006054704 A1 | 5/2006 |

OTHER PUBLICATIONS

State Intellectual Property Office of the People's Republic of China, Office Action and Search Report Issued in Application No. 2015108232035, dated Mar. 20, 2019, 15 pages. (Submitted with Partial Translation).
State Intellectual Property Office of the People's Republic of China, Office Action and Search Report Issued in Application No. 201510821616.X, dated Mar. 28, 2019, 14 pages. (Submitted with Partial Translation).
Japanese Patent Office, Office Action Issued in Application No. 2018-526930, dated Apr. 16, 2019, 8 pages. (Submitted with Machine Translation).
ISA State Intellectual Property Office of the People's Republic of China, Written Opinion of the International Searching Authority Issued in Application No. PCT/CN2016/107041, dated Feb. 16, 2017, WIPO, 6 pages.
ISA State Intellectual Property Office of the People's Republic of China, Written Opinion of the International Searching Authority Issued in Application No. PCT/CN2016/107053, dated Feb. 22, 2017, WIPO, 8 pages.
Japanese Patent Office, Office Action Issued in Application No. 2018-543419, dated May 28, 2019, 6 pages. (Submitted with Machine Translation).
ISA State Intellectual Property Office of the People's Republic of China, International Search Report Issued in Application No. PCT/CN2016/107053, dated Feb. 22, 2017, WIPO, 4 pages.
European Patent Office, Extended European Search Report Issued in Application No. 16868012.2, dated Oct. 24, 2018, Germany, 6 pages.
ISA State Intellectual Property Office of the People's Republic of China, International Search Report Issued in Application No. PCT/CN2016/107041, dated Feb. 16, 2017, WIPO, 4 pages.
European Patent Office, Extended European Search Report Issued in Application No. 16868004.9, dated Oct. 11, 2018, Germany, 8 pages.
State Intellectual Property Office of the People's Republic of China, Office Action and Search Report Issued in Application No. 201510821616.X, dated Sep. 18, 2019, 7 pages. (Submitted with Machine Translation).
State Intellectual Property Office of the People's Republic of China, Office Action and Search Report Issued in Application No. 201510823203.5, dated Nov. 20, 2019, 15 pages. (Submitted with Machine Translation).
Japanese Patent Office, Office Action Issued in Application No. 2018-526930, dated Nov. 26, 2019, 4 pages. (Submitted with Machine Translation).
United States Patent and Trademark Office, Office Action Issued in U.S. Appl. No. 15/778,458, dated Jan. 15, 2020, 21 pages.
European Patent Office, Office Action Issued in Application No. 16868004.9, dated Mar. 25, 2020, Germany, 4 pages.

* cited by examiner

LINE CARD CHASSIS, MULTI-CHASSIS CLUSTER ROUTER, ROUTING SELECTING, AND PACKET PROCESSING

CROSS-REFERENCE TO RELATED APPLICATIONS

The present application is a U.S. National Phase of International Patent Application Serial No. PCT/CN2016/107041 entitled "LINE CARD FRAME, MULTI-FRAME CLUSTER ROUTER, ROUTING, AND MESSAGE PROCESSING," filed on Nov. 24, 2016. International Patent Application Serial No. PCT/CN2016/107041 claims priority to Chinese Patent Application No. 201510821616.X, filed on Nov. 24, 2015. The entire contents of each of the above-cited applications are hereby incorporated by reference in their entirety for all purposes.

BACKGROUND

A router is a network infrastructure working on Layer 3 of the Open System Interconnection (OSI) protocol model, i.e., a packet switching device on the network layer, and it has abilities to connect different types of networks and select a packet transmission path. With rapid development of the internet, further requirements are raised for the router as the network infrastructure; in many situations, the switching capacity, number of slots and interface capacity of a core router cannot meet the requirements.

DETAILED DESCRIPTION

To make the technique, characteristics, and technical effects of the present disclosure clearer, the present disclosure will be further described hereinafter in combination with detailed embodiments.

A router has a lot of specifications. For example, slot number is the maximum number of line card units (or service processing units) that can be provided by the router; interface capacity is the maximum number of certain ports that can be provided by the router, interface capacity=the number of line card units*the number of ports of each line card unit; and switching capacity is a technical indicator in a switch fabric, and it refers to the maximum throughput capacity in the switch fabric. When the slot number, switching capacity, and interface capacity of a core router cannot meet requirements, especially after it has been just deployed, an operator may hope to flexibly expand the core router. When one router chassis cannot meet the requirements, multiple router chassis may be used to expand the switching capacity and interface capacity, and thus multi-chassis cluster routers are emerging.

Multi-chassis clustering refers to interconnecting single-chassis routers using a concatenating technique to form a new multi-chassis cluster system so as to expand the switching capacity, slot number and interface capacity. A multi-chassis cluster router generally consists of central switch fabric chassis, line card chassis and interconnection optical fibers. In the multi-chassis cluster router, packet switching between the line card chassis is carried out by the central switch fabric chassis. However, the multi-chassis cluster router may only consist of the line card chassis. In this case, the line card chassis are directly connected (back-to-back) with each other through optical fibers, and packet switching between the line card chassis is carried out by switch fabric units inside the line card chassis.

In embodiments of the present disclosure, a multi-chassis cluster router may include only line card chassis or may include line card chassis and central switch fabric chassis. When only the line card chassis are included, the line card chassis in a back-to-back form constitute the multi-chassis cluster router without a central switch fabric chassis. The line card chassis as provided by the embodiments of the present disclosure in the following may be used to concatenate respective chassis of the multi-chassis cluster router: for example, in case of the multi-chassis router including only the line card chassis, concatenating the line card chassis of the multi-chassis router, or in case of the multi-chassis router having not only the line card chassis but also the central switch fabric chassis, concatenating the line card chassis and the central switch fabric chassis of the multi-chassis router.

Figure 1:
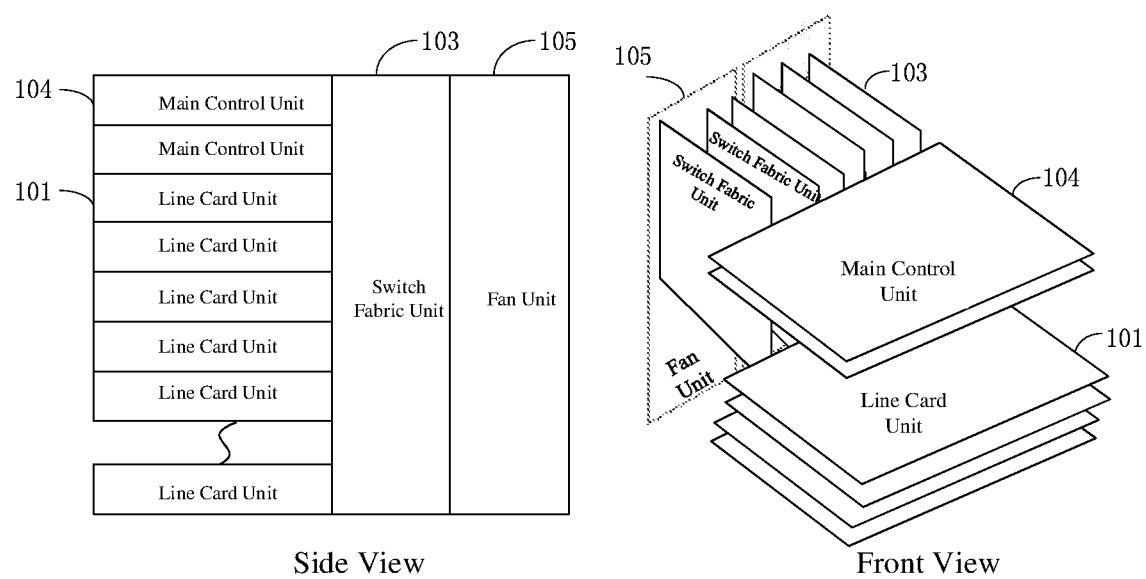
FIG. 1 is a side view and a front view of a line card chassis of a multi-chassis cluster router provided according to examples of the present disclosure.

FIG. 1 is a side view and a front view of a line card chassis of a multi-chassis cluster router provided according to embodiments of the present disclosure. Referring to FIG. 1, the line card chassis of the multi-chassis cluster router provided according to the embodiments of the present disclosure adopts a three-level structure of "main control units 104/line card units 101+switch fabric units 103+fan units 105", in which multiple units having a same function are parallel to each other and a space occupied by them belongs to a same level. As shown in FIG. 1, each line card unit 101 or main control unit 104 occupies a first-level slot, each switch fabric unit 103 occupies a second-level slot, and a fan unit 105 occupies a third-level slot. Here, the levels of the slots are only used to distinguish respective parts of the hierarchical structure, and should not be construed as limitation to the present disclosure.

A line card unit 101 and a switch fabric unit 103 are connected using an orthogonal-without-back-board connection. In this way, without changing the housing height of the router, the switching capacity, slot density, and interface density of a single line card chassis can be improved, and a front-rear air duct is supported. In embodiments of the present disclosure, air inlet holes are provided on panels of the main control units/line card units, so that cold air can enter into the air inlet holes and then pass through the main control units/line card units and the switch fabric units to form hot air and then hot air is discharged from the fan units. The so called orthogonal-without-back-board connection refers to a connection, in which boards (line card unit and switch fabric unit) are directly connected through a connector without using a printed circuit board, and an angle between the boards is 90 degrees or 270 degrees; it is different from a traditional back-board connection or orthogonal-back-board connection.

Figure 2A:
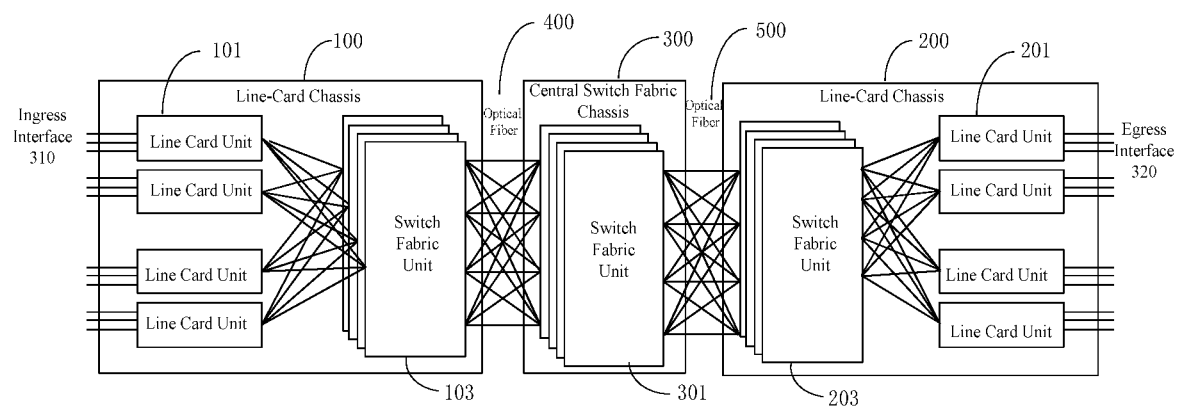
FIG. 2A is a block diagram showing function modules of a multi-chassis cluster router provided according to examples of the present disclosure.

FIG. 2a is a block diagram showing function modules of a multi-chassis cluster router provided according to embodiments of the present disclosure. Based on the line card chassis shown in FIG. 1, the structure of a corresponding multi-chassis cluster router is shown in FIG. 2a. Take the multi-chassis cluster router including a central switch fabric chassis and line card chassis as an example. The multi-chassis cluster router consists of a line card chassis 100, a central switch fabric chassis 300 and a line card chassis 200. In FIG. 2a, there is no traditional back board unit.

Figure 2B:
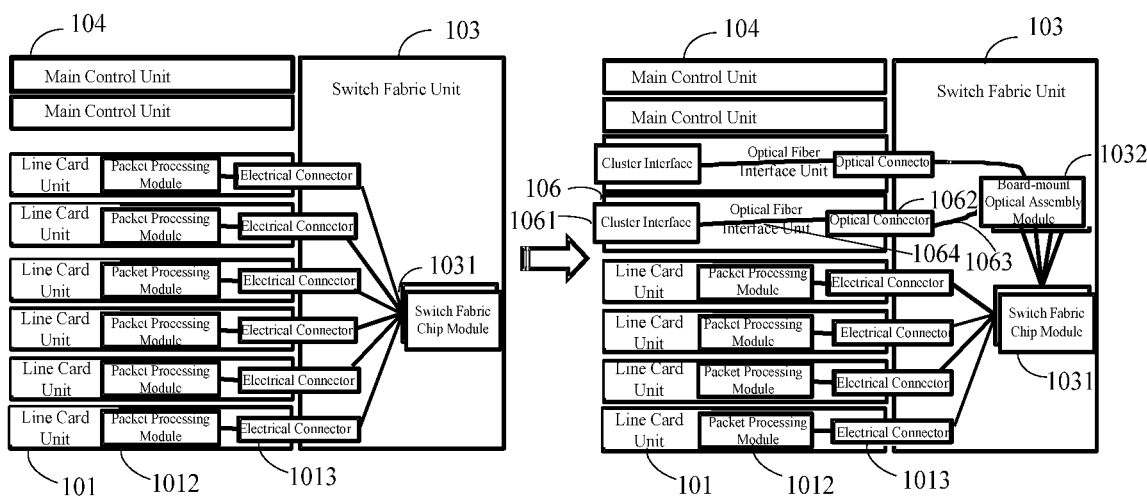
FIG. 2B is a schematic diagram showing how components of a line card chassis are connected provided according to examples of the present disclosure.

FIG. 2b is a schematic diagram showing how components of a line card chassis are connected provided according to embodiments of the present disclosure. Referring to FIG. 2b, in an embodiment of the present disclosure, a part of line card unit slots in the line card chassis are modified to optical fiber interface unit slots, and onboard optical assembly modules 1032 are added to the switch fabric unit 103. The onboard optical assembly modules 1032 convert electrical signals of switch fabric chip modules 1031 into optical signals. An onboard optical assembly module 1032 has an electrical signal interface and an optical signal interface, in which the optical signal interface of the onboard optical assembly module 1032 is connected to an optical connector 1062 through an optical fiber 1063, and each optical connector 1062 provides multi-cord optical fiber interconnection. An optical fiber interface unit 106 connects an optical signal interface on the optical connector 1062 to a cluster interface 1061 on a panel of the line card chassis using an optical fiber 1064. Through the series of connections, a signal coming from the switch fabric chip module 1031 finally arrives at the cluster interface 1061. Then, the cluster interface 1061 of the line card chassis is connected to a switch fabric unit of the central switch fabric chassis, or in case of a back-to-back connection, it is connected to a cluster interface of another line card chassis.

The line card units 101 include packet processing modules 1012; to enable a signal of a packet processing module 1012 of a line card unit 101 to arrive at a cluster interface 1061, further, each cluster interface 1061 has signal transmission channels with all the packet processing modules 1012 in the line card chassis where the cluster interface 1061 is located; and/or, each packet processing module 1012 in the line card chassis has signal transmission channels with all the cluster interfaces 1061 in the line card chassis. Having a signal transmission channel means that a signal can be transmitted through a medium from a start point to a destination point, and the medium includes, but not limited to, packet processing module, printed board circuit, electrical connector, switch fabric chip module, optical-electrical conversion module, optical fiber, optical connector, etc.

Signals of a cluster interface 1061 may come from all of or a part of switch fabric chip modules 1031 in the line card chassis where the cluster interface 1061 is located. Each cluster interface 1061 has signal transmission channels with all switch fabric chip modules 1031 in the line card chassis where the cluster interface 1061 is located; and/or each packet processing module 1012 has signal transmission channels with all the switch fabric chip modules 1031 within the line card chassis where the packet processing module 1012 is located. Meanwhile, when each packet processing module 1012 in the line card chassis has signal transmission channels with all the switch fabric chip modules 1031 in the line card chassis, signals of each cluster interface 1061 evenly come from all the switch fabric chip modules 1031 of all switch fabric units 103 in the line card chassis.

The cluster interfaces are used to concatenate respective chassis of the router, i.e., scarifying a part of line card unit slots to realize clustering of the router; for example, a cluster interface concatenating line card chassis in case of the line card chassis being back-to-back connected without a central switch fabric chassis; and concatenating line card chassis and a central switch fabric chassis in case of with the central switch fabric chassis.

Generally, compared to an electrical connector 1013, an optical connector 1062 has a smaller volume, which can realize a higher density, and thus optical fiber interface units 106 only occupy a relatively small slot space; the optical connectors 1062 support plugging of the optical fiber interface units 106, and also support plugging of the switch fabric units 103. Meanwhile, the electrical connectors 1013 also support plugging of the line card units 101 and plugging of the switch fabric units 103.

In addition, the connection without a back board enables the electrical connectors 1013 and the optical connectors 1062 to be easily changed without changing the chassis.

In the present disclosure, link bandwidths in the ingress direction and egress direction of the switch fabric chip module are not limited, as long as a signal from the ingress direction can be output in the egress direction. In an embodiment of the present disclosure, link bandwidths in the ingress direction and egress direction of each switch fabric chip module 1031 are equal, which can guarantee forwarding with a non-blocking wire-speed.

In an embodiment, when a transmission distance is relatively far, on an electrical signal transmission path from an onboard optical assembly module 1032 to a switch fabric chip module 1031, a signal conditioning circuit is included.

In an embodiment, when a transmission distance is relatively far, on an electrical signal transmission path from a switch fabric chip module 1031 to a packet processing module 1012 of the line card unit 101, a signal conditioning circuit is included.

Based on the foregoing, another embodiment of the present disclosure provides an improved method where an optical connector 1062 may include multiple sub-interfaces, and each sub-interface provides a multi-cord optical fiber connection.

Based on the foregoing, another embodiment of the present disclosure provides an improved solution where a cluster interface 1061 may include multiple sub-interfaces, and each sub-interface provides a multi-cord optical fiber connection.

Through the connections in FIG. 2a and FIG. 2b, a packet goes through the entire multi-chassis cluster router via a 3-stage route selection procedure. As shown in FIG. 2a, the multi-chassis cluster router consists of the line card chassis 100, the central switch fabric chassis 300 and the line card chassis 200. The line card chassis 100 and the central switch fabric chassis 300 are connected through optical fibers 400, and the central switch fabric chassis 300 and the line card chassis 200 are connected through optical fibers 500. The line card chassis 100 includes multiple line card units 101 and multiple switch fabric units 103. Similarly, the line card chassis 200 includes multiple line card units 201 and multiple switch fabric units 203. In the ingress direction (from left to right in FIG. 2a), a first-stage route selection is performed for a packet at a switch fabric unit 103 of the line card chassis 100; a second-stage route selection is performed for the packet at a switch fabric unit 301 of the central switch fabric chassis 300; and a third-stage route selection is performed for the packet at a switch fabric unit 203 of the line card chassis 200. That is, a packet forwarding path of the multi-chassis cluster router is: ingress interface 310→line card unit 101 of the line card chassis 100→switch fabric unit 103 of the line card chassis 100→optical fiber 400→switch fabric unit 301 of the central switch fabric chassis 300→optical fiber 500→switch fabric unit 203 of the line card chassis 200→line card unit 201 of the line card chassis 200→egress interface 320. If the direction from right to left is the ingress direction, i.e., entering from the line card chassis 200 and outputting from the line card chassis 100, a path is opposite to the foregoing packet forwarding path.

The structures and functions of the line card chassis 100 and 200 may be totally same. The line card units 101 of the line card chassis 100 carry out functions such as packet parser, classification, forwarding by looking up a table, buffering, monitoring and statistics, traffic management, queue scheduling, packet shaping and reassembling; switch fabric units 103 of the line-card chassis 100 carry out packet switching between different line card units of the line card chassis (based on packet switching or information CELL switching), the switch fabric units 103 of the line card chassis 100 also transmit packets from the line card chassis 100 to destination line card chassis through the central switch fabric chassis 300 and receive packets from the central switch fabric chassis 300; the switch fabric units 301 of the central switch fabric chassis 300 are responsible for packet switching between different line card chassis.

Figure 3:
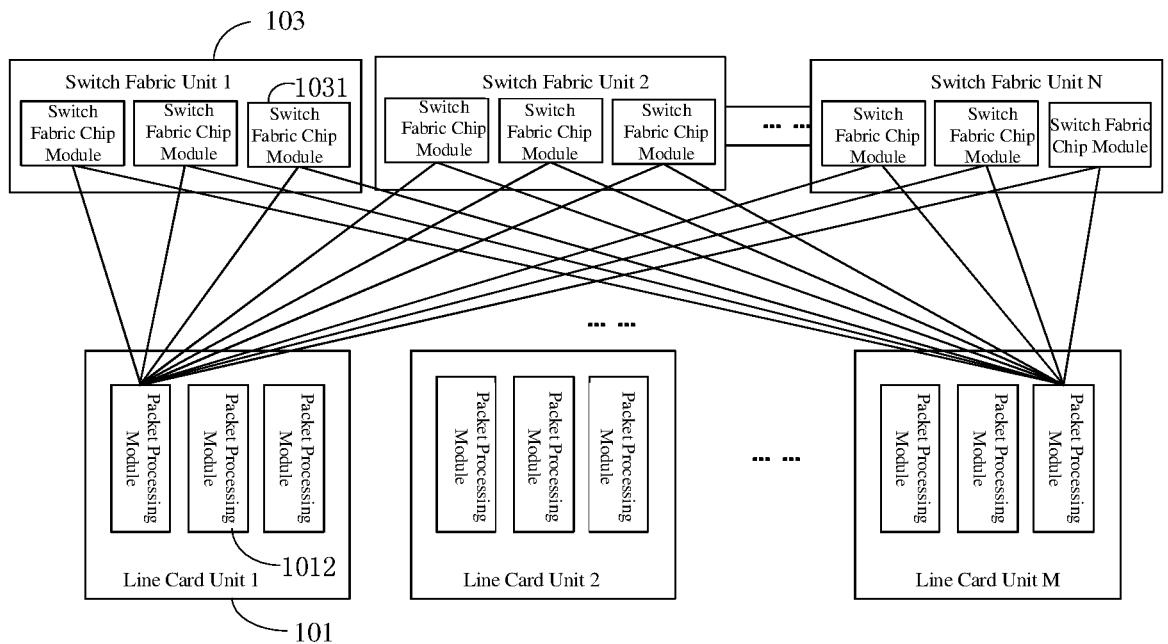
FIG. 3 is a schematic diagram showing how line card units and switch fabric units are connected provided according to examples of the present disclosure.

FIG. 3 is a schematic diagram showing how line card units and switch fabric units are connected provided according to embodiments of the present disclosure. Referring to FIG. 3, each packet processing module 1012 in a line card chassis has signal transmission channels with all switch fabric chip modules 1031 of all switch fabric units 103 in the line card chassis, so that connection signals of a packet processing module 1012 can be evenly allocated to all the switch fabric chip modules 1031 of all the switch fabric units 103 in the line card chassis. When the embodiment of the present disclosure is implemented, on one hand, when local switching inside the line card chassis happens, data between line cards of the line card chassis can be evenly shared by all the switch fabric chip modules 1031 to support redundancy; on the other hand, when inter-switching between different line card chassis occurs, through the connection between the switch fabric units 103 and the optical fiber interface units 106, data between the line cards can be shared by all the switch fabric chip modules 1031, then further shared by all the cluster interfaces 1061, and then shared by all the switch fabric units 301 of the central switch fabric chassis 300.

To further facilitate understanding how line card units 101 and switch fabric units 103 are connected provided according to embodiments of the present disclosure, detailed examples are provided in the following. Assume that there are 12 line card units 101, 6 switch fabric units 103 and 3 optical fiber interface units 106 in a line card chassis, in which each line card unit 101 is provided with 3 packet processing modules 1012, each packet processing module 1012 has 36 lanes of signals (36 receiving signals and 36 transmitting signals) to the switch fabric units 103, each switch fabric unit 103 has 3 switch fabric chip modules 1031, each switch fabric chip module 1031 has 144 lanes of signals (144 receiving signals and 144 transmitting signals), each switch fabric unit 103 is provided with 3 optical connectors 1062, each optical connector 1062 is provided with 6 sub-interfaces, each onboard optical assembly module 1032 converts 12 lanes of signals (12 transmitting signals and 12 receiving signals) into 24-cord optical signals, each optical fiber interface unit 106 is provided with 12 cluster interfaces 1061, and each cluster interface 1061 is provided with 3 sub-interfaces.

Figure 4:
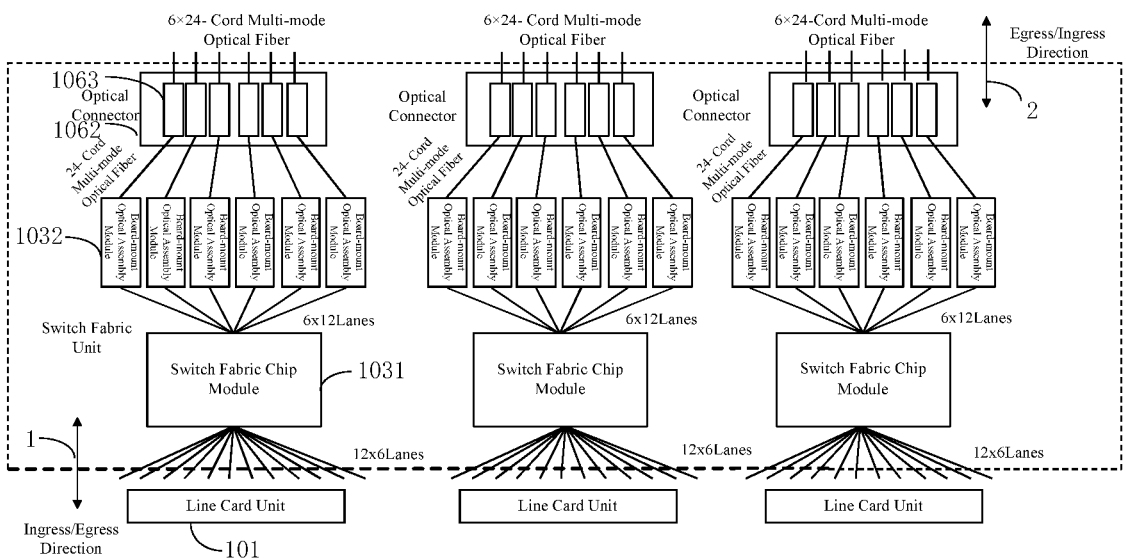
FIG. 4 is a schematic diagram showing how components inside a switch fabric unit are connected provided according to examples of the present disclosure.

FIG. 4 is a schematic diagram showing how components inside a switch fabric unit are connected provided according to embodiments of the present disclosure. Referring to FIG. 4, in an ingress direction (egress direction) shown by an arrow 1, a switch fabric chip module 1031 has link connections with 36 packet processing modules 1012 in 12 line card units 101, so that 72 lanes of signals of the switch fabric chip modules 1031 are evenly allocated to the 36 packet processing modules 1012 in the 12 line card units 101; correspondingly, 36 lanes of signals of a packet processing module 1012 are evenly allocated to 18 switch fabric chip modules 1031 of 6 switch fabric units 103, i.e., 2 lanes of signals between each switch fabric unit chip 1031 and each packet processing module 1012.

In an egress direction (ingress direction) shown by an arrow 2, a switch fabric chip module 1031 is connected with 6 onboard optical assembly modules 1032 so that another 72 lanes of signals of the switch fabric chip module 1031 are evenly allocated to the 6 onboard optical assembly modules 1032, in which each onboard optical assembly module 1032 converts an electrical signal into an optical signal and couples the optical signal to an optical connector 1062, each optical connector is provided with 6 sub-interfaces 1063, and each sub-interface 1063 is provided with a 24-cord multi-mode optical fiber. That is, the 6*24-cord multi-mode optical fibers evenly share 2 lanes of signals of each packet processing module 1012.

Figure 5:
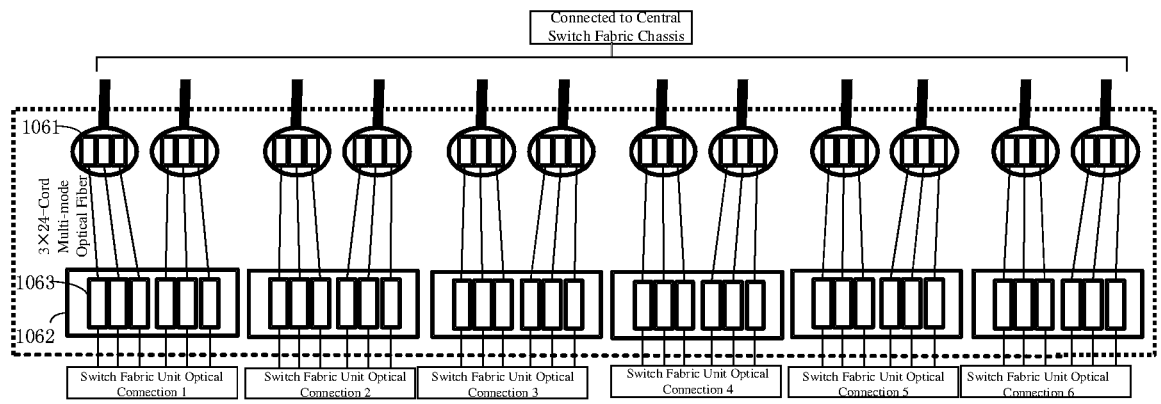
FIG. 5 is a schematic diagram showing how components inside an optical fiber interface unit are connected provided according to examples of the present disclosure.

FIG. 5 is a schematic diagram showing how components inside an optical fiber interface unit are connected provided according to embodiments of the present disclosure. Referring to FIG. 5, each cluster interface 1061 is provided with a 72-cord multi-mode optical interface (i.e., three 24-cord sub-interfaces), i.e., 36 lanes of signals of a cluster interface 1061 evenly share 36 packet processing modules 1012.

Figure 6:
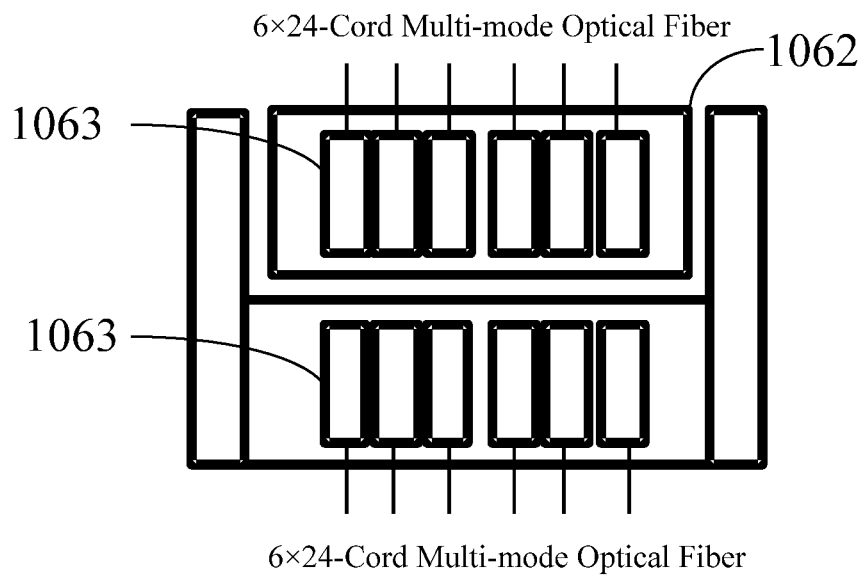
FIG. 6 is a schematic diagram showing an inner structure of an optical connector provided according to examples of the present disclosure.

FIG. 6 is a schematic diagram showing an inner structure of an optical connector provided according to embodiments of the present disclosure. Referring to FIG. 6, an optical connector 1062 includes multiple sub-interfaces 1063, and each sub-interface 1063 is provided with a multi-cord optical fiber connection. By using the multiple sub-interfaces, on one hand, a connection density of optical signals can be improved, and on the other hand, difficulty in implementing an optical connector at a sub-interface can be avoided. During a plugging procedure of an optical connector between a switch fabric unit and an optical fiber interface unit, the optical connector and optical fibers of a sub-interface can be prevented from being damaged.

The cluster interface 1061 may use multiple sub-interfaces to improve a connection density of optical signals and to avoid difficulty in implementing an optical connector at a sub-interface; and on the other hand, the number of optical fibers between the line card chassis and the central switch fabric chassis can be simplified so that wiring engineering is easier to realize.

Figure 7:
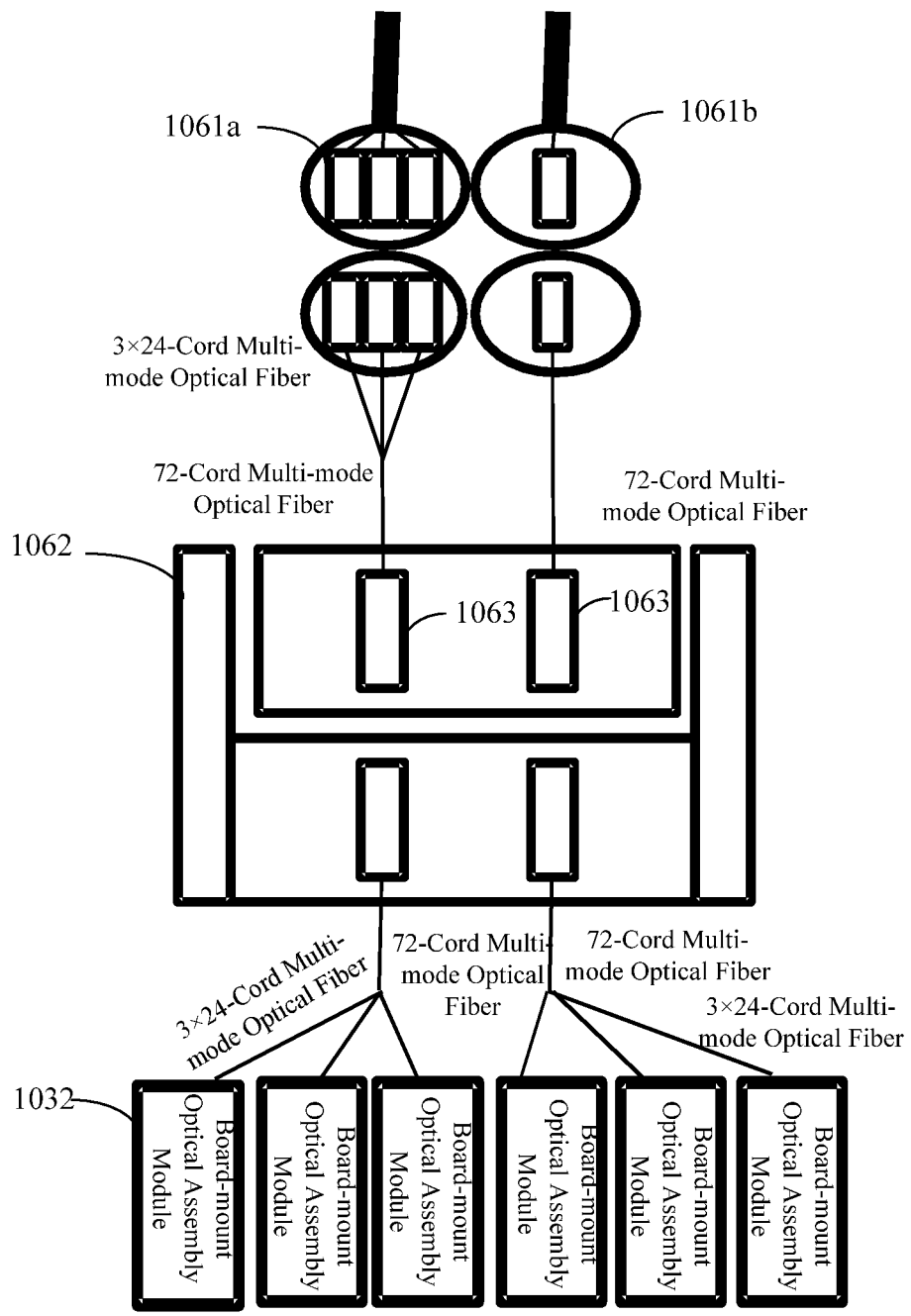
FIG. 7 is a schematic diagram showing an inner structure of an optical connector and a cluster interface provided according to examples of the present disclosure.

In an embodiment, optical connectors and multi-cord breakout optical fibers with a higher density are used. FIG. 7 is a schematic diagram showing an inner structure of an optical connector and a cluster interface provided according to embodiments of the present disclosure. As shown in FIG. 7, an optical connector 1062 uses 72-cord sub-interfaces 1063, and cluster interfaces have two kinds of specifications, in which the specification of the cluster interface 1061a is 3*24 cords, and the specification of the cluster interface 1061b is 72 cords.

In an embodiment, during implementation, there may be a cross connection between switch fabric chip modules 1031 and on-board optical assembly modules 1032, and meanwhile, optical fibers between onboard optical assembly modules 1032 and optical connectors 1062 are also crossed, so that finally 72-cord optical signals (36 lanes of signals) of the cluster interface 1061 evenly share 36 packet processing modules 1012, during which procedure, a cross connection of multi-cord breakout optical fibers may be used.

Figure 8:
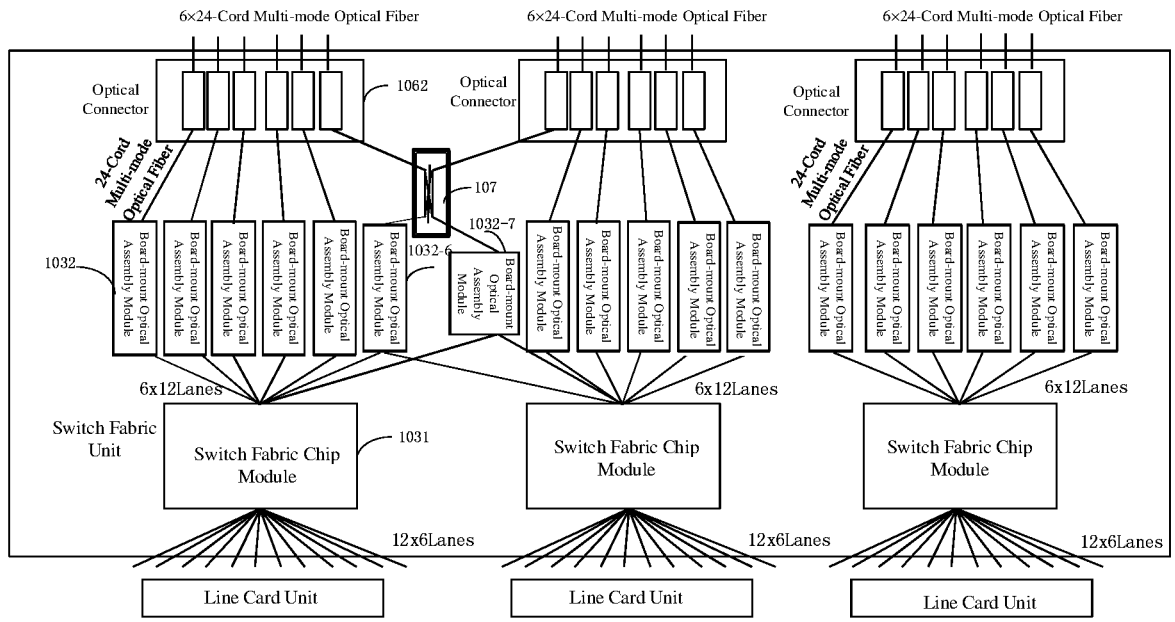
FIG. 8 is a schematic diagram showing how components inside a switch fabric unit are connected provided according to examples of the present disclosure.

FIG. 8 is a schematic diagram showing how components inside a switch fabric unit are connected provided according to embodiments of the present disclosure. Referring to FIG. 8, the sixth onboard optical assembly module 1032-6 and the seventh onboard optical assembly module 1032-7 counted from left come from different switch fabric chip modules 1031, and in this case, an optical signal of the onboard optical assembly module 1032-6 is crossly connected to two different optical connectors 1062 or sub-interfaces of the optical connectors through a multi-cord breakout optical fiber 107, and an optical signal of the onboard optical assembly module 1032-7 is also crossly connected to two different optical connectors 1062 or sub-interfaces of the optical connectors through a multi-cord breakout optical fiber 107.

Figure 9:
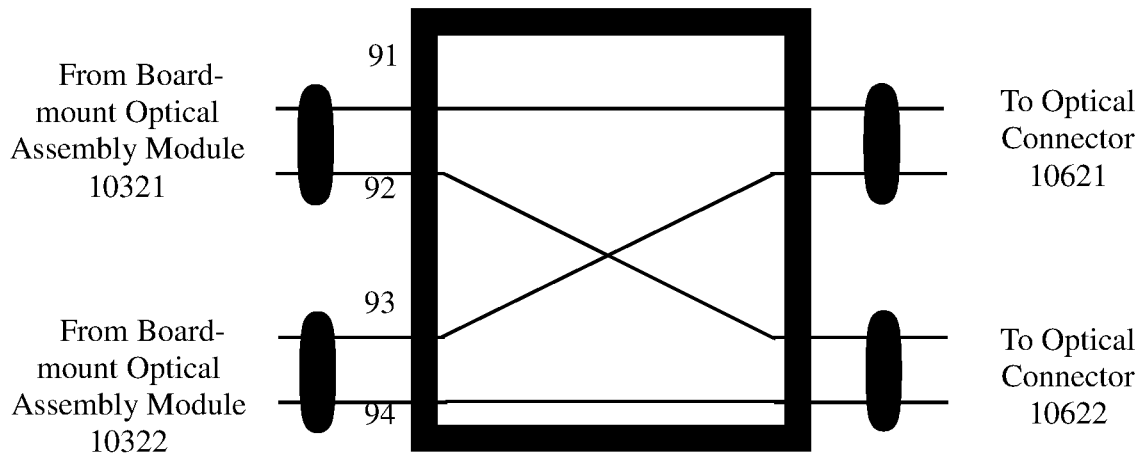
FIG. 9 is a schematic diagram showing a cross connection of multi-cord breakout optical fibers between onboard optical assembly modules and optical connectors provided according to examples of the present disclosure.

FIG. 9 is a schematic diagram showing a cross connection of multi-cord breakout optical fibers between onboard optical assembly modules and optical connectors provided according to embodiments of the present disclosure. Referring to FIG. 9, onboard optical assembly modules 10321 and 10322 and optical connectors 10621 and 10622 are crossly connected using multi-cord breakout optical fibers, in which optical signals from different onboard optical assembly modules 10321 and 10322 are connected to different optical connectors 10621 and 10622 or sub-interfaces of the optical connectors 10621 and 10622 using an optical fiber patch cord mode. The optical fiber patch cord mode refers to changing an ingress direction and an egress direction or changing a sequence of lines of signals at interfaces by inner connections of an optical fiber. For example, an optical fiber 91 from the onboard optical assembly module 10321 is connected to the optical connector 10621, and an optical fiber 92 from the onboard optical assembly module 10321 is connected to the optical connector 10622; while an optical fiber 93 from the onboard optical assembly module 10322 is connected to the optical connector 10621, and an optical fiber 94 from the onboard optical assembly module 10322 is connected to the optical connector 10622. In an embodiment, a cross connection of multi-cord breakout optical fibers may be implemented at optical fiber interface units.

It is to be specified that the number of line card units, switch fabric units and optical fiber interface units contained in a line card chassis is not limited in the present disclosure, and it may be configured as demanded.

Embodiments of the present disclosure further provide a multi-chassis cluster router using the forgoing line card chassis.

In case of route-selection in a same line card chassis, the foregoing line card chassis may be used, and in case of route-selection between different line card chassis, the foregoing line card chassis may be used too.

Embodiments of the present disclosure further provide a line card chassis route-selection method. The method is implemented using the foregoing line card chassis, and it is used to perform different route selections for an ingress line card chassis and an egress line card chassis, and during a route-selection procedure, on a packet transmission direction, after a switch fabric unit of the ingress line card chassis performs a route selection, an onboard optical assembly module converts an electrical signal is into an optical signal, and the optical signal is transmitted to a cluster interface of the ingress line card chassis through an optical fiber interface unit and is output through the cluster interface of the ingress line card chassis; and after the egress line card chassis receives an optical signal from a cluster interface of the egress line card chassis, the optical signal is transmitted to a switch fabric unit of the egress line card chassis through an optical fiber interface unit, and an onboard optical assembly module converts the optical signal into an electrical signal, and the electrical signal arrives at an egress line card unit of the egress line card chassis according to a route selection by a switch fabric chip module of a switch fabric unit of the egress line card chassis.

The embodiments of the present disclosure further provide a packet processing method which is implemented on a foregoing multi-chassis cluster router. The method includes the following steps:

a line card unit of an ingress line card chassis performs packet processing in a packet ingress direction;

after a switch fabric unit of the ingress line card chassis performs a route selection, an onboard optical assembly module converts an electrical signal into an optical signal, the optical signal is transmitted to a cluster interface of the ingress line card chassis through an optical fiber interface unit and output by the cluster interface of the ingress line card chassis, and after the optical signal arriving at a cluster interface of an egress line card chassis is received by the egress line card chassis, it is transmitted to a switch fabric unit of the egress line card chassis through an optical fiber interface unit, where an onboard optical assembly module converts the optical signal into an electrical signal, and the electrical signal arrives at an egress line card unit of the egress line card chassis according to a route selection by a switch fabric chip module of the switch fabric unit of the egress line card chassis; and the egress line card unit performs packet processing in a packet egress direction.

Figure 10:
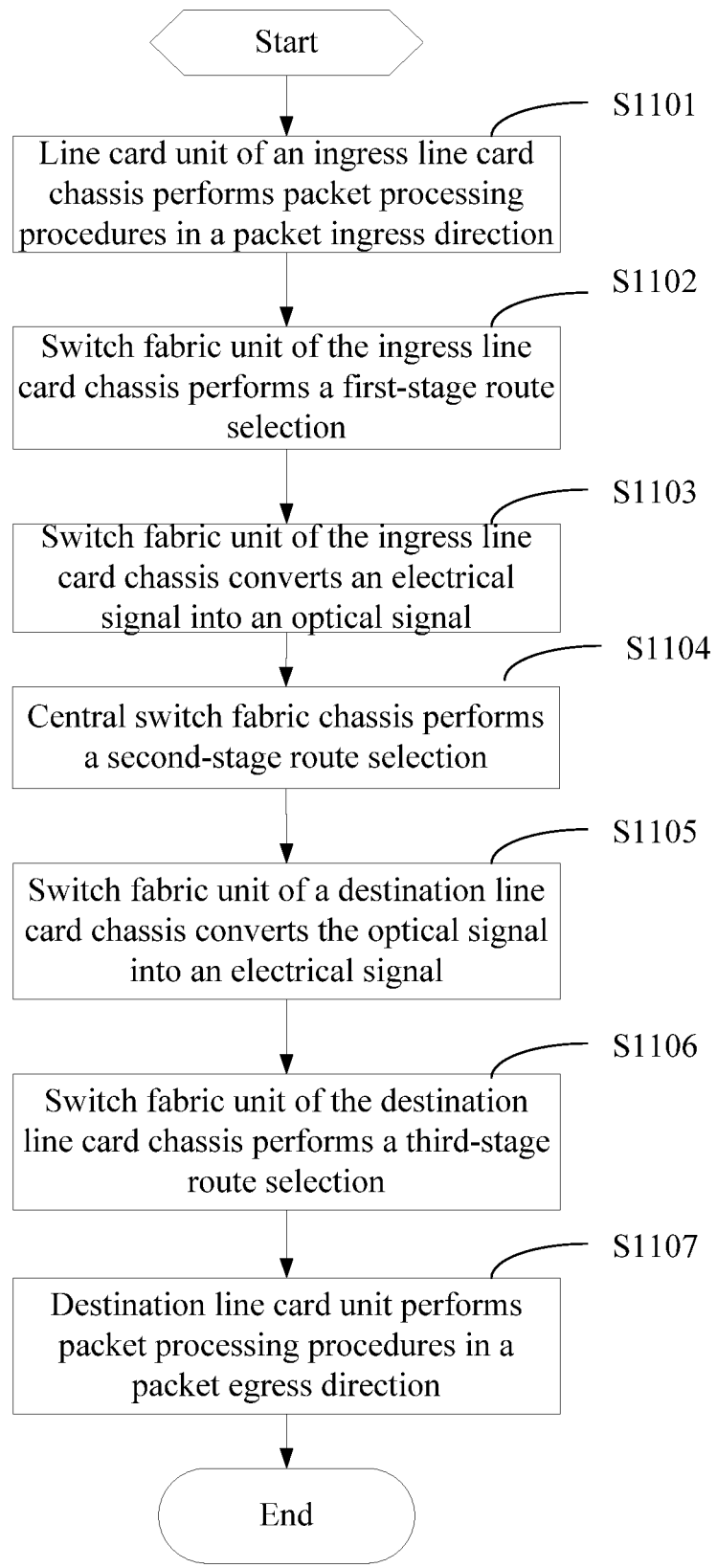
FIG. 10 is a schematic diagram showing a packet forwarding and processing flow of a multi-chassis cluster system provided according to examples of the present disclosure.

FIG. 10 is a schematic diagram showing a packet forwarding and processing flow of a multi-chassis cluster system provided according to embodiments of the present disclosure. In combination with FIG. 2a, when the multi-chassis cluster router provided according to embodiments of the present disclosure includes line card chassis and a central switch fabric chassis, a packet forwarding path passes through the ingress line card chassis 100, the central switch fabric chassis 300 and the egress line card chassis 200 in sequence, and a flow of a corresponding packet processing method is as shown in FIG. 10. The flow includes the following steps.

Block S1101: a line card unit 101 of the ingress line card chassis 100 performs packet processing in a packet ingress direction, and procedures of packet processing include: packet parser, classification, buffering, traffic management, forwarding by looking up a table, packet shaping and attaching a header to enter into a switch fabric;

Block S1102: a switch fabric unit 103 of the ingress line card chassis 100 performs a first-stage route-selection: if a destination of a packet is the ingress line card chassis, then the switch fabric unit 103 transmits the packet to a destination line card unit 101 of the ingress line card chassis 100, and block S1107 is entered; and if the destination of the packet is another line card chassis, then block S1103 is performed. The route-selection for example is performed by looking up a routing table/forwarding table and the routing table/forwarding table is calculated by a main control unit of the router.

Block S1103: the switch fabric unit 103 of the ingress line card chassis 100 converts an electrical signal into an optical signal: respectively through an onboard optical assembly module, an optical connector, a cluster interface and optical fibers between them of the ingress line card chassis 100, and then through the optical fiber 400, into the central switch fabric chassis 300.

Block S1104: the central switch fabric chassis 300 performs a second-stage route selection: an ingress interface of the central switch fabric chassis 300 converts the optical signal into an electrical signal, finds a destination line card chassis through a header of the packet, and an egress interface converts the electrical signal into an optical signal and transmits it to the egress line card chassis 200 through the optical fiber 500.

Block S1105: a switch fabric unit of the egress line card chassis 200 converts the optical signal into an electrical signal: through a cluster interface, an optical connector, an onboard optical assembly module and optical fibers between them.

Block S1106: the switch fabric unit of the egress line card chassis 200 performs a third-stage route selection: transmitting the packet to a destination line card unit of the egress line card chassis 200 according to a destination described in the header of the packet.

Block S1107: the destination line card unit performs packet processing in the packet egress direction, in which procedures of packet processing in the egress direction include: packet reassembling, quality of service (traffic management, queue scheduling, etc.), link layer information adding, and packet transmission.

When a multi-chassis cluster router includes line card chassis and a central switch fabric chassis, the second-stage route selection is carried out by the central switch fabric chassis, and when a router does not include a central switch fabric chassis but only includes line card chassis, the second-stage route selection is carried out by the line card chassis. Or the line card chassis all perform the second-stage route selection, but one of them is in a bypass mode, which case is similar to a single-chassis mode.

It should be understood that, though the description is described based on respective embodiments, the way of describing is only for clarity purpose, and should not be construed as one embodiment including only an independent technical scheme. Those skilled in the art should deem the description as its entirety, and the technical schemes in the respective embodiments may be properly combined to form other implementations that can be understood by those skilled in the art.

What is described in the foregoing are only examples of the present disclosure, and should not be construed as limitation to the present disclosure. Any changes, equivalent replacements, modifications made without departing from the scope and spirit of the present disclosure are intended to be included within the protecting scope of the present disclosure.

The invention claimed is:

1. A line card chassis, wherein the line card chassis comprising line card units, switch fabric units, and optical fiber interface units;

the switch fabric unit comprises a switch fabric chip module and an onboard optical assembly module, wherein the onboard optical assembly module is used for mutual conversion between an optical signal and an electrical signal; an electrical signal interface of the onboard optical assembly module is connected to the switch fabric chip module which has a switching and route-selecting function, and the switch fabric chip module is connected to the line card unit through an electrical connector; and an optical signal interface of the onboard optical assembly module is connected to the optical fiber interface unit through an optical connector; and the optical fiber interface unit is to couple the optical signal to a cluster interface on a panel of a router through an optical fiber; and the cluster interface is to concatenate different chassis of the router;

wherein the line card units comprise packet processing modules; a respective cluster interface in the line card chassis has signal transmission channels with all the packet processing modules in the line card chassis;

wherein the respective cluster interface has signal transmission channels with all the switch fabric chip modules in the line card chassis; and/or the respective packet processing module in the line card chassis has signal transmission channels with all the switch fabric chip modules in the line card chassis.

2. The line card chassis of claim 1, wherein the line card chassis further comprises fan units; the line card chassis adopts a 3-level slot structure, where the line card unit or optical fiber interface unit occupies one first-level slot, the switch fabric unit occupies one second-level slot, and the fan unit occupies a third-level slot; the line card unit and the switch fabric unit are connected using an orthogonal electrical connection without a back board, and the optical fiber interface unit and the switch fabric unit are connected through an optical connection.

3. The line card chassis of claim 1, wherein bandwidths of links in an ingress direction and in an egress direction of a respective switch fabric chip module are equal.

4. The line card chassis of claim 1, wherein on an electrical signal transmission path between the onboard optical assembly module and the switch fabric chip module, a signal conditioning circuit is comprised; and/or on an electrical signal transmission path between the switch fabric chip module and the packet processing module, a signal conditioning circuit is comprised.

5. The line card chassis of claim 1, wherein the onboard optical assembly module and the optical connector are crossly connected through a multi-cord breakout optical fiber.

6. A multi-chassis cluster router, comprising multiple chassis which are concatenated to each other, wherein each chassis of the multi-chassis cluster router comprises a line card chassis,
  wherein the line card chassis comprises line card units, switch fabric units, and optical fiber interface units;
  wherein the switch fabric unit comprises a switch fabric chip module and an onboard optical assembly module, wherein the onboard optical assembly module is used for mutual conversion between an optical signal and an electrical signal; an electrical signal interface of the onboard optical assembly module is connected to the switch fabric chip module which has a switching and route-selecting function, and the switch fabric chip module is connected to the line card unit through an electrical connector; and an optical signal interface of the onboard optical assembly module is connected to the optical fiber interface unit through an optical connector; and the optical fiber interface unit is to couple the optical signal to a cluster interface on a panel of the multi-chassis cluster router through an optical fiber; and the cluster interface is to concatenate different chassis of the multi-chassis cluster router;
  wherein the line card units comprise packet processing modules; a respective cluster interface in the line card chassis has signal transmission channels with all the packet processing modules in the line card chassis;
  wherein the respective cluster interface has signal transmission channels with all the switch fabric chip modules in the line card chassis; and/or the respective packet processing module in the line card chassis has signal transmission channels with all the switch fabric chip modules in the line card chassis.

7. The multi-chassis cluster router of claim 6, wherein the line card chassis further comprises fan units; the line card chassis adopts a 3-level slot structure, wherein the line card unit or the optical fiber interface unit occupies one first-level slot, the switch fabric unit occupies one second-level slot, and the fan unit occupies a third-level slot; the line card unit and the switch fabric unit are connected using an orthogonal electrical connection without a back board, and the optical fiber interface unit and the switch fabric unit are connected through an optical connection.

8. The multi-chassis cluster router of claim 6, wherein bandwidths of links in an ingress direction and in an egress direction of a respective switch fabric chip module are equal.

9. The multi-chassis cluster router of claim 6, wherein on an electrical signal transmission path between the onboard optical assembly module and the switch fabric chip module, a signal conditioning circuit is comprised; and/or on an electrical signal transmission path between the switch fabric chip module and the packet processing module, a signal conditioning circuit is comprised.

10. The multi-chassis cluster router of claim 6, wherein the onboard optical assembly module and the optical connector are crossly connected through a multi-cord breakout optical fiber.

11. A line card chassis route-selecting method for different route selections of an egress line card chassis and an ingress line card chassis,
  wherein each of the egress line card chassis and the ingress line card chassis is configured to have line card units, switch fabric units, and optical fiber interface units;
  wherein the switch fabric unit comprises a switch fabric chip module and an onboard optical assembly module, wherein the onboard optical assembly module is used for mutual conversion between an optical signal and an electrical signal; an electrical signal interface of the onboard optical assembly module is connected to the switch fabric chip module which has a switching and route-selecting function, and the switch fabric chip module is connected to the line card unit through an electrical connector; and an optical signal interface of the onboard optical assembly module is connected to the optical fiber interface unit through an optical connector; and the optical fiber interface unit is to couple the optical signal to a cluster interface on a panel of a router through an optical fiber; and the cluster interface is to concatenate different chassis of the router;
  wherein the line card units comprise packet processing modules; a respective cluster interface in the line card chassis has signal transmission channels with all the packet processing modules in the line card chassis;
  wherein the respective cluster interface has signal transmission channels with all the switch fabric chip modules in the line card chassis; and/or the respective packet processing module in the line card chassis has signal transmission channels with all the switch fabric chip modules in the line card chassis,
  the method comprising the following steps:
    on a packet transmission direction, after the switch fabric unit of the ingress line card chassis performs a route selection, converting, by the onboard optical assembly module of the ingress line card chassis, the electrical signal into the optical signal, the optical signal being transmitted to the cluster interface of the ingress line card chassis through the optical fiber interface unit of the ingress line card chassis so as to be output through the cluster interface of the ingress line card chassis; and after the egress line card chassis receives the optical signal from the cluster interface of the egress line card chassis, transmitting, by the egress line card chassis, the optical signal to the switch fabric unit of the egress line card chassis through the optical fiber interface unit of the egress line card chassis, converting, by the onboard optical assembly module of the switch fabric unit of the egress line card chassis, the optical signal into the electrical signal, wherein the electrical signal arrives at the line card unit serving as an egress line card unit of the egress line card chassis according to a route selection by the switch fabric chip module of the switch fabric unit of the egress line card chassis.

12. A packet processing method, wherein, the method is applied by a multi-chassis cluster router,
  wherein, the multi-chassis cluster router comprises multiple chassis which are concatenated to each other, each chassis of the multi-chassis cluster router, having a line card chassis,
  wherein the line card chassis comprises line card units, switch fabric units and optical fiber interface units;
  wherein the switch fabric unit comprises a switch fabric chip module and an onboard optical assembly module, wherein the onboard optical assembly module is used for mutual conversion between an optical signal and an electrical signal; an electrical signal interface of the onboard optical assembly module is connected to the switch fabric chip module which has a switching and route-selecting function, and the switch fabric chip module is connected to the line card unit through an electrical connector; and an optical signal interface of the onboard optical assembly module is connected to the optical fiber interface unit through an optical connector; and the optical fiber interface unit is to couple the optical signal to a cluster interface on a panel of the multi-chassis cluster router through an optical fiber; and the cluster interface is to concatenate different chassis of the multi-chassis cluster router;

wherein the line card units comprise packet processing modules; a respective cluster interface in the line card chassis has signal transmission channels with all the packet processing modules in the line card chassis;

wherein the respective cluster interface has signal transmission channels with all the switch fabric chip modules in the line card chassis; and/or the respective packet processing module in the line card chassis has signal transmission channels with all the switch fabric chip modules in the line card chassis, the method comprising:

performing, by the line card unit of the line card chassis serving as an ingress line card chassis, packet processing in a packet ingress direction;

after the switch fabric unit of the ingress line card chassis performs a route selection, converting, by the onboard optical assembly module, the electrical signal into the optical signal, the optical signal being transmitted to the cluster interface of the ingress line card chassis through the optical fiber interface unit of the ingress line card chassis so that the optical signal is output through the cluster interface of the ingress line card chassis, and after the optical signal arrives at the cluster interface of the line card chassis serving as an egress line card chassis and is received by the egress line card chassis, transmitting, by the egress line card chassis, the optical signal to the switch fabric unit of the egress line card chassis through the optical fiber interface unit, and converting, by the onboard optical assembly module of the egress line card chassis, the optical signal into the electrical signal, the electrical signal arriving at the line card unit serving as an egress line card unit of the egress line card chassis according to a route selection by the switch fabric chip module of the switch fabric unit of the egress line card chassis; and performing, by the egress line card unit of the egress line card chassis, packet processing in a packet egress direction.

\* \* \* \* \*